July 7, 1925.

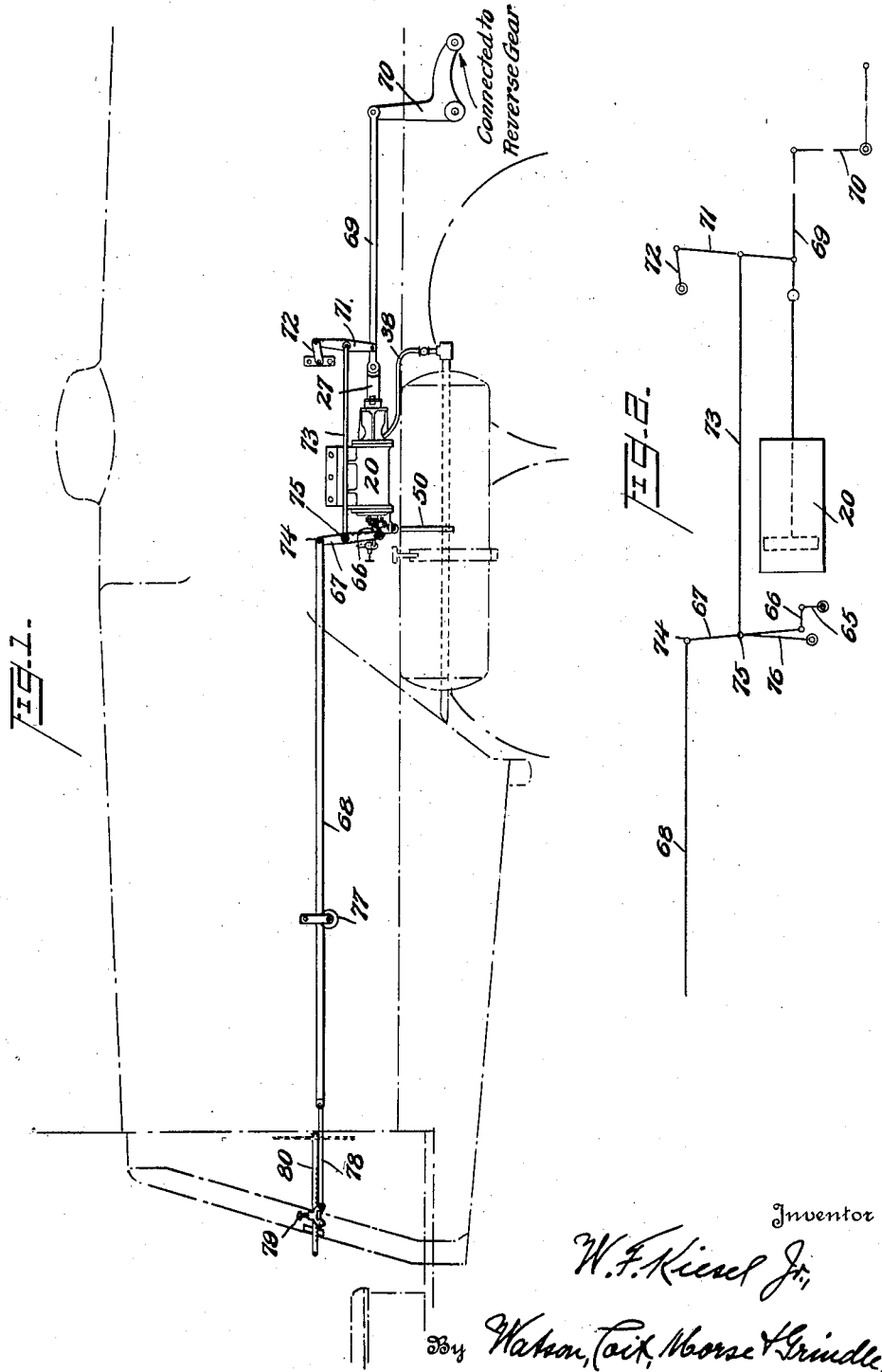

W. F. KIESEL, JR
POWER REVERSE GEAR
Filed Sept. 30, 1920

Inventor
W. F. Kiesel Jr.,
By Watson, Coit, Morse & Grindle,
Attorneys.

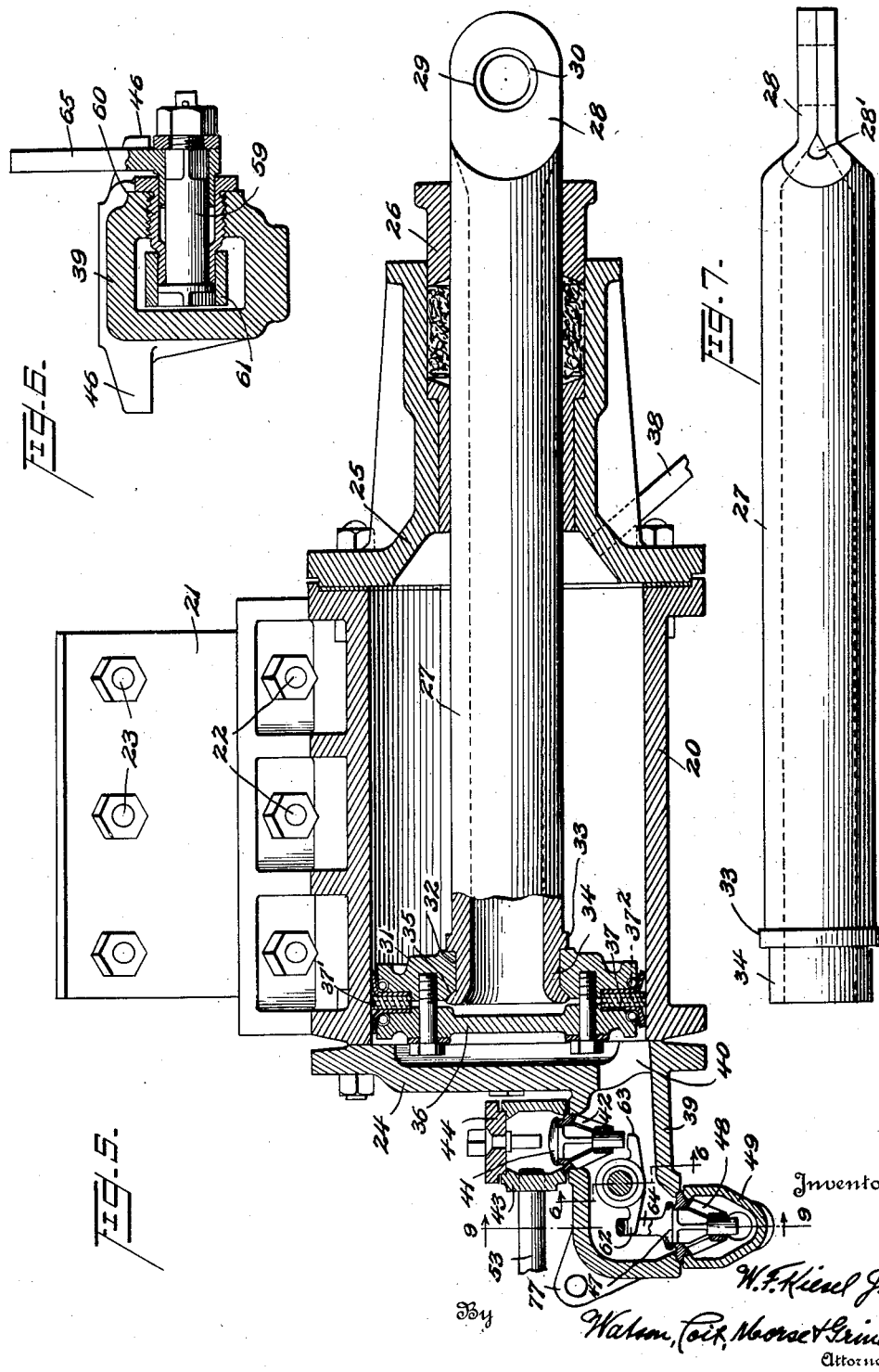

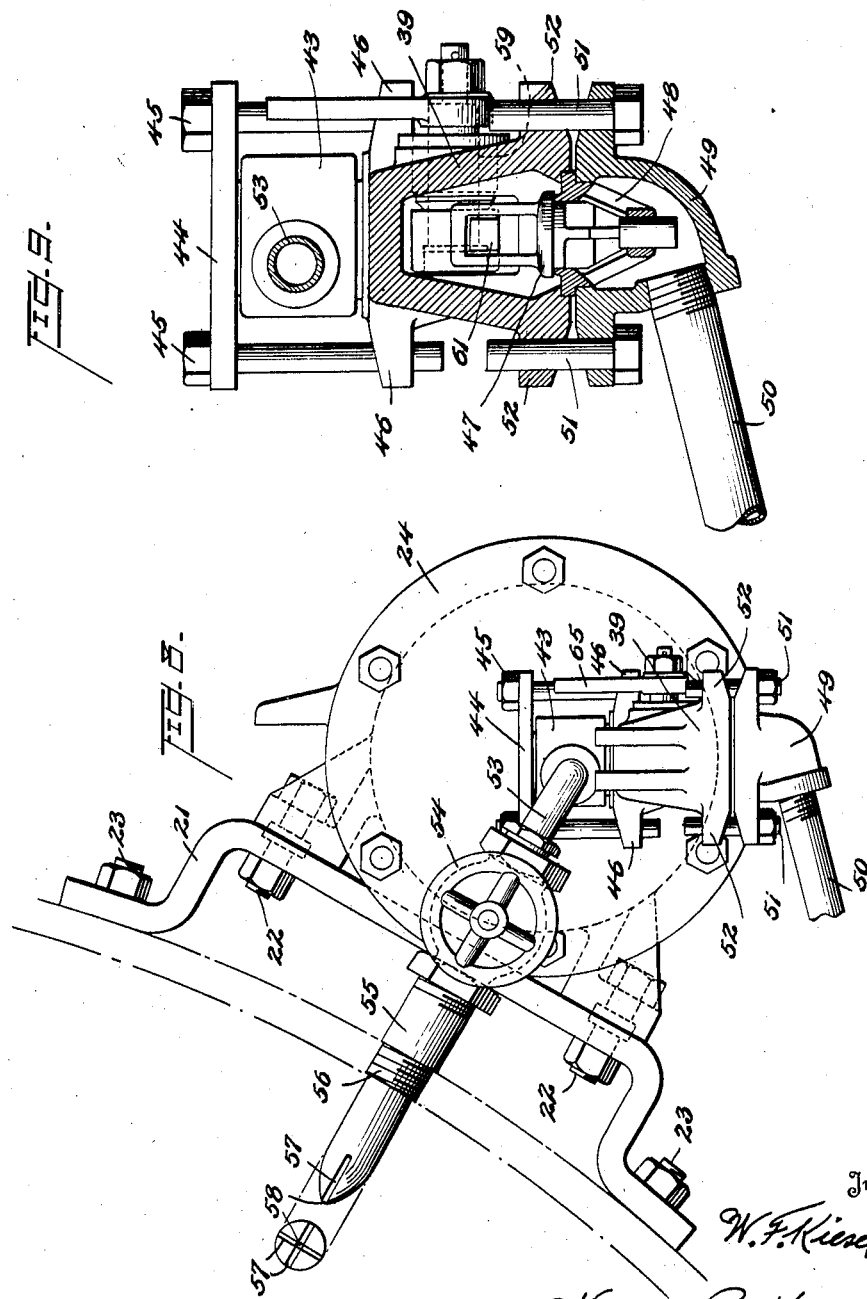

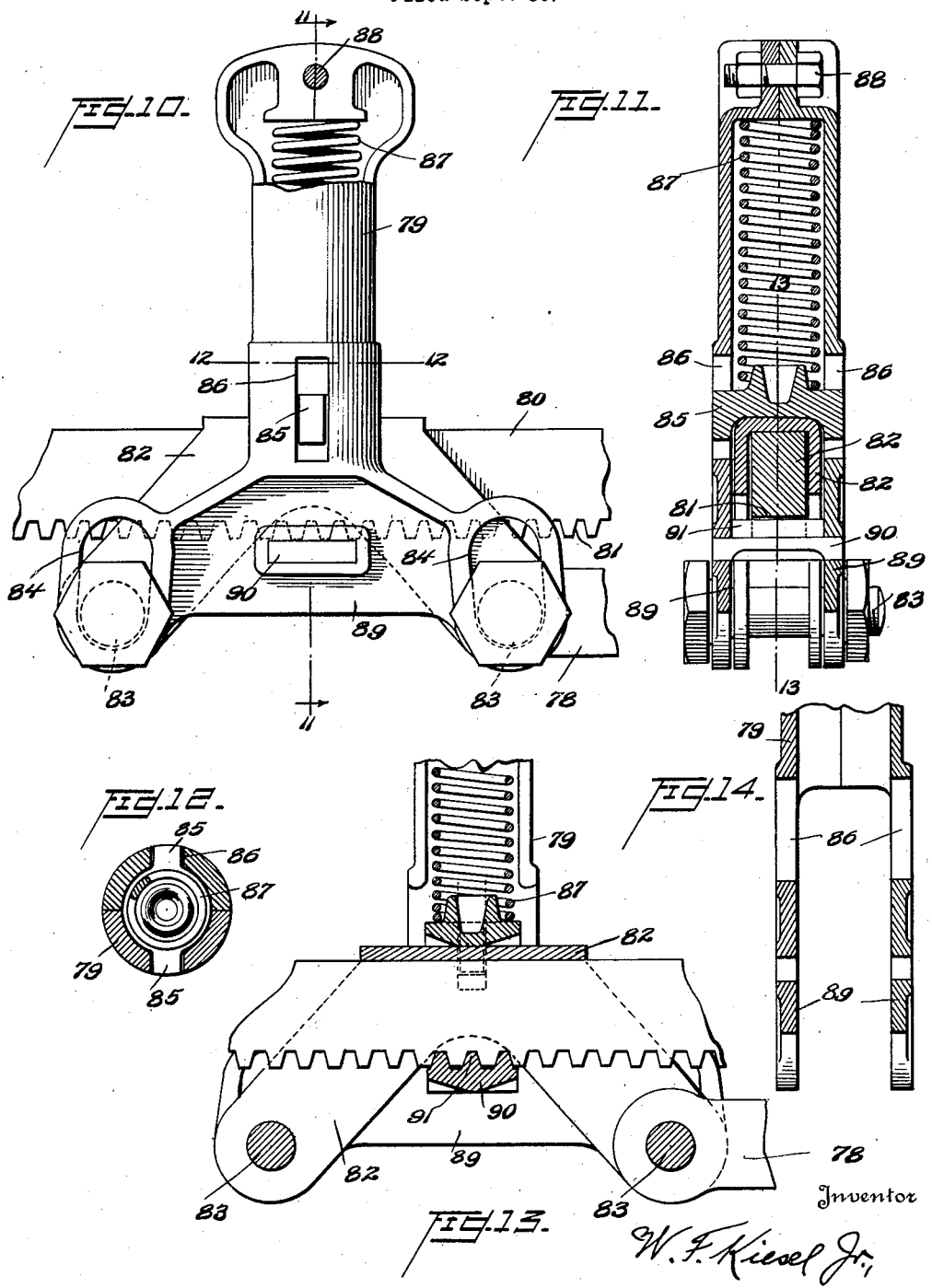

Patented July 7, 1925.

1,544,992

UNITED STATES PATENT OFFICE.

WILLIAM F. KIESEL, JR., OF ALTOONA, PENNSYLVANIA.

POWER REVERSE GEAR.

Application filed September 30, 1920. Serial No. 413,945.

*To all whom it may concern:*

Be it known that I, WILLIAM F. KIESEL, Jr., a citizen of the United States, and residing at Altoona, Blair County, State of Pennsylvania, have invented certain new and useful Improvements in Power Reverse Gears, of which the following is a specification.

The present invention relates to power reverse gear mechanism for steam locomotives and more particularly to the motor for actuating the reverse gear and the means for controlling the motor.

The principal features of novelty consist in the provision of a reverse gear motor actuated in one direction by water under pressure from the boiler; a valve for controlling the operation of the motor carried by the same; a novel valve for governing the action of the motor; mechanism for actuating the valve from the cab of the locomotive; an improved locking handle in the cab for operating the valve; a novel mechanism for connecting the handle and the valve; means for effecting the return of the motor in case there is a creep due to leakage; a novel linkage associated with the above mentioned mechanism to operate the valve to effect the return of the motor when there is a creep; and the provision of a novel form of piston rod for the motor.

Other novel features and objects of the invention will be apparent from the description taken in connection with the drawings in which:

Figure 1 is a side elevation of a reverse gear operating mechanism constructed in accordance with the present invention, part of the locomotive to which it is attached being shown in dotted lines;

Figure 2 is a diagrammatic view of the linkage for operating the valve from the cab and the associated linkage for actuating the valve in case the motor creeps;

Figure 5 is a longitudinal sectional elevation through the motor and the valve carried by one head;

Figure 6 is a sectional elevation through the valve taken substantially on the line 6—6 of Figure 5;

Figure 7 is a top plan view of the piston rod, before the piston has been assembled thereon;

Figure 8 is an enlarged elevation of one end of the motor and associated parts;

Figure 9 is a sectional view of the valve taken substantially on the line 9—9 of Figure 5;

Figure 10 is a side elevation of the operating handle in the cab and the support for the same;

Figure 11 is a sectional elevation of the handle and its support taken substantially on the line 11—11 of Figure 10;

Figure 12 is a sectional elevation taken substantially on the line 12—12 of Figure 10;

Figure 13 is a sectional elevation through the handle and support taken substantially on the line 13—13 of Figure 11; and Figure 14 is a sectional view through the bottom part of the handle member, the section being the same as shown in Figure 11.

Figure 4:
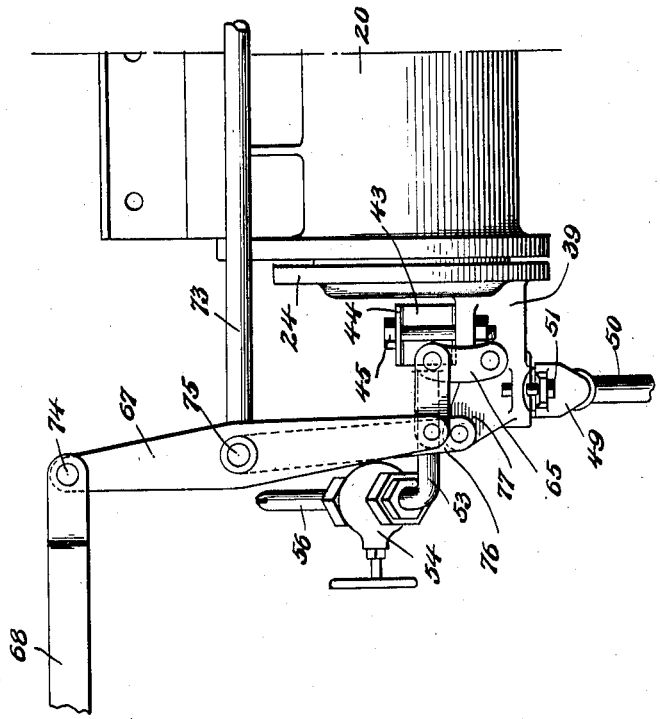
Figure 4 is an enlarged view of one end of the motor, the valve carried at said end and part of the linkage for operating the same.

Briefly stated, the present invention comprises a motor constructed to operate a reverse gear. This motor as shown is of the reciprocating type and has a piston actuated in one direction by air pressure, this end of the cylinder being continually in communication with the air system of the locomotive. The piston is adapted to be actuated in the opposite direction by liquid pressure, and according to the present invention this is accomplished by placing the corresponding end of the cylinder in communication with the boiler of the locomotive below the water level thereof. A valve, preferably carried by the motor, controls the supply of liquid to the motor and the exhaust from the same. As shown, this valve is operated from the cab by means of a linkage. Further mechanism is provided so that if there is leakage by the piston of the motor and the latter creeps, the creeping motion will be utilized to actuate the valve and operate the motor to return it to its original position.

As shown in the drawings the motor comprises a cylinder 20 secured to a bracket 21 as by means of bolts 22 and the bracket in turn is secured to the boiler shell by means of studs 23. Preferably, the cylinder is located upon the side of the locomotive and between the cab and the valve gear. The cylinder has one end closed by a head 24 and the opposite end by a head 25, the latter being provided with a suitable stuffing box 26 for a piston rod 27. Preferably, this piston rod is made from iron pipe. The pipe at one end has its walls pressed together to provide a portion 28 of substantially rectangular cross section and this end portion is formed with an aperture 29 transverse to the axis of the pipe, a suitable bushing 30 being pressed into said aperture. At its opposite end the pipe is adapted to be secured to the piston of the motor. As shown, the piston comprises an annular member 31 having a central bore 32. The pipe at this end is formed with an exterior shoulder 33 spaced from the adjacent end, thus providing a cylindrical part 34 which fits in the aperture 32 of the piston. The two parts are secured together by expanding or swaging out the tip end of the pipe as indicated at 35, Figure 5. The piston further includes a circular plate member 36 between which and the member 31 a suitable packing device is clamped. This packing device includes a disk 37 formed with a peripheral groove 37', and a plurality of radial ducts $37^2$ affording communication between said groove and the interior of the piston rod. Thus, any leakage around the piston passes from said groove through the ducts to the interior of the piston rod, and is discharged into the atmosphere, through the apertures 28' at the opposite end of the rod.

The right hand end of the cylinder 20, as viewed in Figure 5, is always in communication with the air system of the locomotive through a pipe 38. Thus the piston is always forced toward the left as viewed in Figures 1 and 5. To move the piston in the opposite direction, the corresponding end of the cylinder is placed in communication with the boiler of the locomotive below the water level thereof so that water under pressure acts on the piston and forces it toward the right as viewed in Figure 5. For the purpose of controlling the flow of this water, a suitable valve is provided and as shown this valve is carried by the motor. Thus the cylinder head 24 is provided with a valve casing 39 preferably being cast integral with the head. The interior of this casing is in communication with the cylinder through the aperture 40 in the head of the cylinder. The flow of water to the motor is controlled by a poppet valve 41 carried by a seat cage 42 clamped between the casing 39 and a bonnet 43. As shown the bonnet 43 is hollow and has an opening in its upper end closed by a plate 44. This plate is clamped against the bonnet and the bonnet against the casing by two bolts 45 which pass through the plate and the lugs 46 of the casing. In a similar manner an exhaust valve 47 is provided for the casing 39 and cooperates with and is carried by the seat cage 48 clamped against the casing by a fitting 49. As shown, this fitting has a pipe 50 screwed into the same and carries the liquid exhaust from the cylinder to any desired place. The fitting 49 is clamped to the casing by bolts 51 passing through the fitting and engaging ears 52 on the casing 39. The bonnet 43 has communication with the boiler through a pipe 53, a suitable stop valve 54 being provided. The connection to the boiler further includes a fitting 55 preferably made from pipe having one end connected with the valve 54 and intermediate its ends being screwed through the boiler shell as indicated at 56. The portion within the boiler is reduced in diameter and the walls of the pipe are shaped into the form shown in Figure 8 and then slitted as indicated at 57, the tip end then being welded as indicated at 58.

Figure 3:
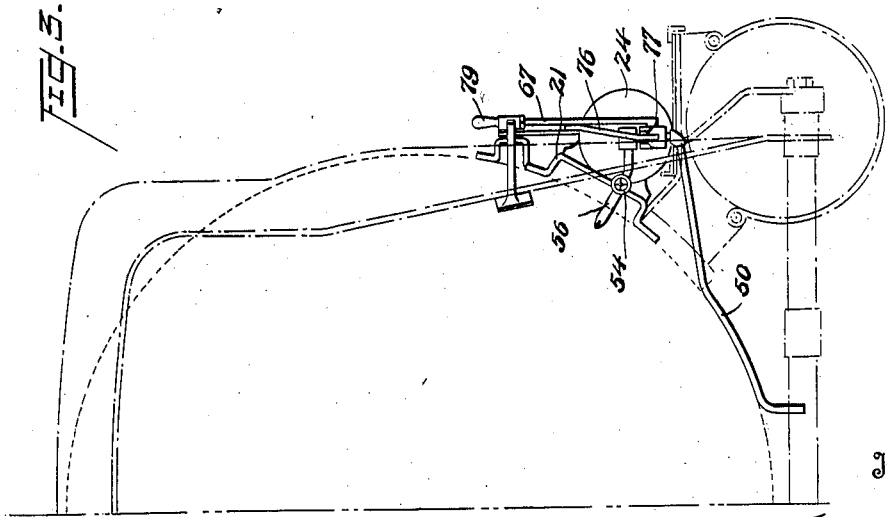
Figure 3 is an end elevation of the parts shown in Figure 1 as seen from the left of said figure.

When it is desired to force the piston toward the right as viewed in Figure 5 the inlet valve 41 is opened so that water from the boiler is supplied to the motor. When it is desired that the piston move toward the left as viewed in Figure 3 the inlet valve remains closed and the exhaust valve 47 is opened thereby permitting the water in the cylinder to flow out through said valve. These two poppet valves are controlled from the cab of the locomotive. As shown in Figures 5, 6 and 9, a shaft 59 extends through a stuffing box 60 into the interior of the casing 39 and at its inner end carries a hub 61 for rotation therewith. This hub is provided with two oppositely extending arms 62 and 63, the arm 62 being positioned within the slot 64 in an extension on the exhaust valve 47 and the other arm 63 being adapted to engage the lower end of the stem of the inlet valve 41. It will be observed, therefore, if the rotatable member 59 is rocked, one or the other of the poppet valves will be opened. To operate the valves in this manner, the shaft 59 outside the casing carries an arm 65 secured thereto for rotation therewith. This arm is adapted to be rocked from the cab of the locomotive.

Figure 2 shows in a diagrammatic way mechanism for actuating the valve from the cab and also means for operating the valve to compensate for any creep of the motor. Referring to this figure it will be seen that the arm 65 is connected by means of a short link 66 to the lower end of a lever 67. The upper end of this lever is connected to a rod 68 and this rod is adapted to be moved longitudinally from the cab. When the rod 68 is moved one way or the other the valve arm 65 will be turned and one or the other of the poppet valves opened. Means for operating the valve to compensate for creeping of the motor will now be described. The piston rod 27 of the motor is connected by a link 69, as shown in Figure 1, to one arm of a bell crank lever 70, the other arm being connected to operate the reverse gear of the locomotive. Movement of the piston is utilized to operate the valve and compensate for creeping. To this end the lever 71 is pivotally connected at one end to the link 69. At its opposite end it is supported by a link 72, and intermediate its ends this lever 71 is connected by a link 73 to the lever 67, the lever 67 being mounted to permit pivotal movement either about pivots 74 or 75. As shown, this is accomplished by supporting the lever 67 on a link 76 the lower end of which is pivotally carried by the ears 77 on the valve casing 39. The upper end of this link is connected to the lever 67 at 75 where the link 73 also joins the same. In the diagrammatic view in Figure 2 the link 76 is shown slightly at an angle to the lever 67, but as will be observed from the other figures of the drawings this link in effect is behind the lever 67. As shown in Figure 1 the rod 68 is guided in any suitable manner as by the rollers 77' and adjacent the cab is connected by rod 78 to an operating handle 79. The construction of the operating handle is clearly shown in Figures 10 to 14 inclusive. A support or bar 80 is rigidly mounted in the cab and the lower side thereof is serrated as indicated at 81. A U-shaped element 82 straddles the bar or support 80 and is slidable therealong. At its lower extremities the U-shaped element has parallel pivots 83 and the handle proper is carried on these pivots. As clearly shown in Figure 14, the lower end of the handle is bifurcated and straddles the element 82. It is formed with slots 84 to receive the pivots 83 and permit rocking movement of the handle about either of these pivots. The handle is forced upwardly and the pivots held at the lower ends of the slots 84 by yielding means. As shown, for this purpose an abutment 85 rests on the top of the element 82 and engages in slots 86 in the handle. Above the abutment the handle is hollow and a spring 87 is disposed therein, one end of which acts against the abutment 85 and the other end against the upper end of the handle tending to force it upwardly. As clearly shown in Figure 11 the handle is made in two like parts and held together at its upper end by a bolt 88. For the purpose of locking the handle and thus the valve actuating mechanism in any desired position, legs 89 of the handle proper carry a transverse locking piece 90 provided with teeth 91 adapted to cooperate with the serrations 81 formed in the bottom of the support. This locking piece is so positioned that when the handle is in vertical or normal position as shown in Figure 10 the teeth thereof are in engagement with the serrations. When it is desired to unlock the handle and operate the valve, it is gripped and forced in the direction it is desired to operate the valve and this will tip the handle about one or the other of the pivots 83 and carry the locking piece 90 out of engagement with the serrations so that the handle and the associated parts may be slid along this support 80.

In the operation of the mechanism described herein, the piston of the motor is always forced in one direction by the air pressure which is usually about 140 pounds per square inch. It is actuated in the opposite direction by water from the boiler, this pressure being about 200 pounds per square inch. Hence when water is admitted to the cylinder the air pressure is overcome and the motor actuated toward the right as viewed in Figure 1. When the water is exhausted from the motor then the air pressure becomes effective to operate the same. If it is desired to move the piston toward the right as viewed in Figures 1 and 5, the handle 79 is grasped and tilted to the right as viewed in Figure 1 and then pushed toward the right and through the linkage will open the inlet valve 41 and admit water to the cylinder overcoming the air pressure and moving the piston toward the right. If it is desired to move the piston toward the left as viewed in Figures 1 and 5, then the handle 79 is rocked and moved toward the left as viewed in Figure 1. This will open the exhaust valve 48 and permit the exhaust of water from the motor, whereupon the air pressure will become effective to move the piston toward the left as viewed in Figure 5.

After having set the reverse gear in the desired adjustment, if the motor should creep and thereby throw the adjustment out the motor will be returned to its original setting automatically. Thus if the piston creeps toward the right as viewed in Figure 5, the lever 71 through the link 73, will turn the lever 67 about its pivot 74 thus rocking the actuating arm of the valve in the direction to open the exhaust valve and permit the release of water. Consequently, the piston will be actuated to return to its original position, the exhaust valve becoming closed as soon as the piston reaches said original position. In a similar manner if the piston should creep toward the left as viewed in Figure 5 the water inlet valve will be opened and closed when the piston has been returned to its original position.

Although a specific embodiment of the invention has been described in detail, it is to be understood that the invention is not thus limited but includes modifications and changes which come within the scope of the appended claims.

Having thus described the invention what I claim as new and desire to secure by Letters Patent is:

1. The combination with a steam locomotive, of a reverse gear motor, a valve for controlling the operation of the motor associated therewith, an arm associated with the valve for operating the same, a lever, a link connecting the arm and lever, and a rod extending from the lever to the cab of the locomotive, a link pivoted on a fixed axis at one end and at the other pivotally connected to said lever intermediate its ends, and a linkage operated by creep of the motor connected to said lever intermediate its ends.

2. The combination with a steam locomotive, of a reverse gear motor including a power actuated member, a valve adjacent the motor for controlling the operation thereof, an actuating arm associated with said valve, a lever, a link connecting one end of said lever and the arm, a rod extending from said lever to the cab pivotally connected to the lever, motion transmitting means operated by movement of said member pivotally connected to said lever, and means supporting the lever for pivotal movement about either of said pivotal connections.

In testimony whereof I affix my signature.

WILLIAM F. KIESEL, Jr.